(12) United States Patent
Divakaran et al.

(10) Patent No.: US 10,955,903 B2
(45) Date of Patent: Mar. 23, 2021

(54) LOW POWER ADVERTISING MODE FOR SEQUENTIAL IMAGE PRESENTATION

(71) Applicant: INTEL CORPORATION, Santa Clara, CA (US)

(72) Inventors: Sudeep Divakaran, Bangalore (IN); VNS Murthy Sristi, Bangalore (IN)

(73) Assignee: INTEL CORPORATION, Santa Clara, CA (US)

(*) Notice: Subject to any disclaimer, the term of this patent is extended or adjusted under 35 U.S.C. 154(b) by 57 days.

(21) Appl. No.: 16/229,447

(22) Filed: Dec. 21, 2018

(65) Prior Publication Data

US 2019/0121421 A1 Apr. 25, 2019

(51) Int. Cl.
*G06F 1/3234* (2019.01)
*G06F 1/3287* (2019.01)
*G09G 5/37* (2006.01)
*G06T 9/00* (2006.01)

(52) U.S. Cl.
CPC .......... *G06F 1/3265* (2013.01); *G06F 1/3287* (2013.01); *G06T 9/00* (2013.01); *G09G 5/37* (2013.01); *G09G 2340/02* (2013.01)

(58) Field of Classification Search
CPC ........ G06F 1/3265; G06F 1/3287; G06T 9/00
See application file for complete search history.

(56) References Cited

U.S. PATENT DOCUMENTS

| | | | |
|---|---|---|---|
| 9,116,697 B2* | 8/2015 | Kwa | G09G 3/3611 |
| 2012/0146968 A1* | 6/2012 | Glen | G09G 5/003 |
| | | | 345/204 |
| 2013/0021352 A1* | 1/2013 | Wyatt | G09G 5/395 |
| | | | 345/520 |
| 2013/0054998 A1* | 2/2013 | Wyatt | G09G 5/003 |
| | | | 713/323 |
| 2013/0147822 A1* | 6/2013 | Yu | G09G 5/393 |
| | | | 345/547 |
| 2014/0184629 A1* | 7/2014 | Wyatt | G09G 5/393 |
| | | | 345/547 |
| 2016/0180796 A1* | 6/2016 | Morein | G09G 5/395 |
| | | | 345/629 |
| 2016/0189333 A1* | 6/2016 | Morein | G09G 5/39 |
| | | | 345/555 |
| 2016/0267883 A1* | 9/2016 | Bibikar | G06F 1/3218 |
| 2016/0275919 A1* | 9/2016 | Lawrence | G09G 5/363 |
| 2017/0061923 A1* | 3/2017 | Cornelius | G06F 3/1462 |
| 2018/0308439 A1* | 10/2018 | Cheng | G09G 3/3618 |
| 2019/0041956 A1* | 2/2019 | Yu | G09G 3/3611 |
| 2019/0303083 A1* | 10/2019 | Shekhar | G06F 3/1423 |
| 2020/0051516 A1* | 2/2020 | Kim | G09G 3/3614 |

* cited by examiner

*Primary Examiner* — Glenn A. Auve
(74) *Attorney, Agent, or Firm* — Kacvinsky Daisak Bluni PLLC

(57) ABSTRACT

Disclosed herein are techniques and a display panel that can sequentially display images while the host processor is inactive (e.g., asleep, power gated, or the like). The display panel includes circuitry to receive a set of encoded images, sequentially decode the encoded images provide a bitstream of the decoded images to the display electronics. The host is arranged to encode the images, send the encoded images to a frame buffer at the panel and configure the panel for a low power multi-image presentation mode.

18 Claims, 7 Drawing Sheets

LOW POWER ADVERTISING MODE FOR SEQUENTIAL IMAGE PRESENTATION

TECHNICAL FIELD

Embodiments described herein generally relate to low power modes of display panels and particularly to presenting multiple images for advertising during a low power mode of a display panel.

BACKGROUND

Modern display panels typically include frame buffers, which are integrated into the display panel and provide memory retention to allow for the panel to "self-refresh." Self-refresh techniques provide a significant boost to energy efficiency of display devices. However, in instances where more than one image is to be presented, the display cannot "simply" self-refresh. As such, a number of processors and interfaces must remain active and power consumption increases in such instances.

DETAILED DESCRIPTION

Figure 1:
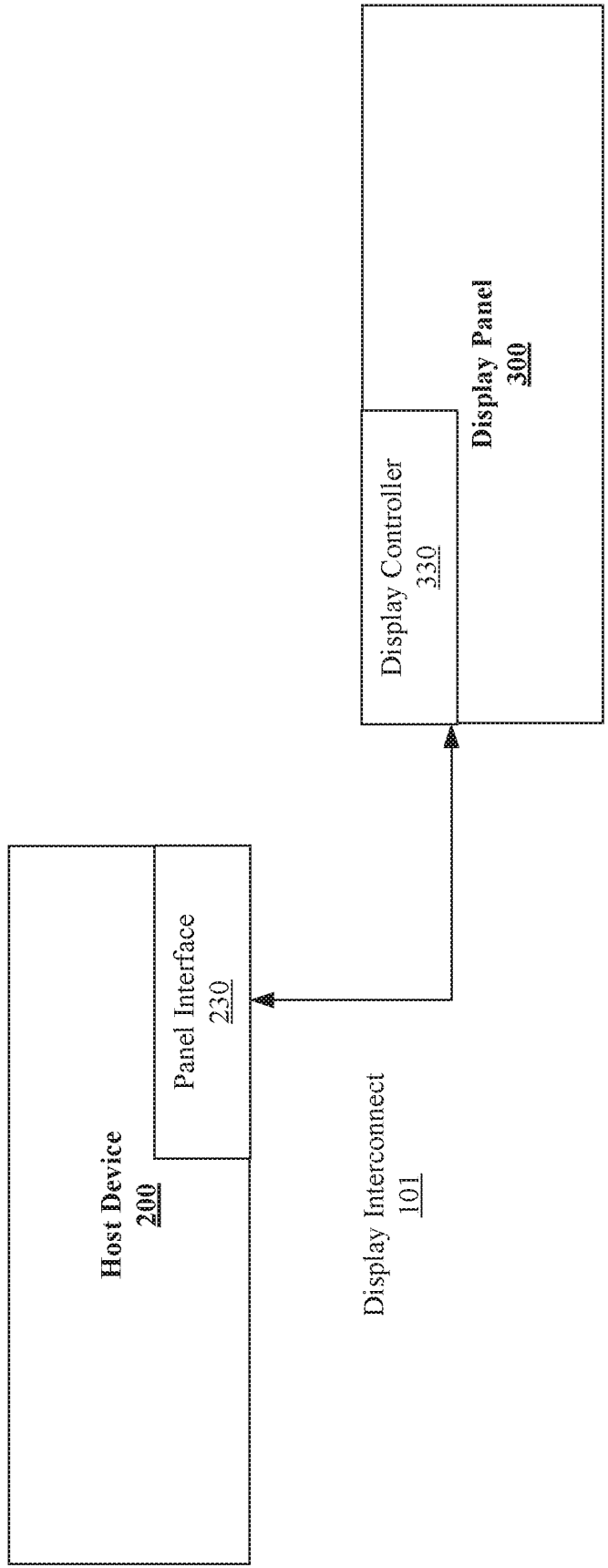
FIG. 1 illustrates an embodiment of a display system.

The present disclosure is generally directed to displaying multiple images during a low power mode of a display panel. The display panel can include a frame buffer to store a set of images and logic to decode the images from the set and cause them to be presented on the display panel in a defined sequence. With some examples, the present disclosure can be implemented to add a new mode to display panels that support low power modes. As a specific example, the present disclosure can be implemented to add support for presenting multiple images during a low power mode according to the mobile industry processor interface (MIPI) display serial interface (DSI) standards promulgated by the MIPI Alliance. With some examples, the present disclosure can augment commands support by a command mode display panel to provide support for storage, decoding, sequential display and rotation of multiple images during a lower power mode of the display panel.

The present disclosure can be implemented such that a display panel can sequentially display images while the host processor is inactive (e.g., asleep, power gated, or the like). As a result, power consumption of the host device can be significantly reduced. This is different than conventional implementations to sequentially display images. For example, in a conventional electronic device (e.g., smart phone, tablet, laptop, photo frame, etc.) the host processor must be active to continually update a frame buffer in the display panel. In cases where video is sent to the display panel, the host processor must also be active to continually send the video frames (e.g., one after the other). Often, the host send the video frames to the display panel buffer irrespective of the display refresh rate. In some display panels, a lower power mode is provided where the display panel includes local memory and can "self-refresh" the display panel from local memory. As such, the host processor could be placed in a lower power state. However, for each new image to be displayed, the host processor would need to be activated and send the new image to the display panel local memory (e.g., display panel buffer).

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

Figure 2:
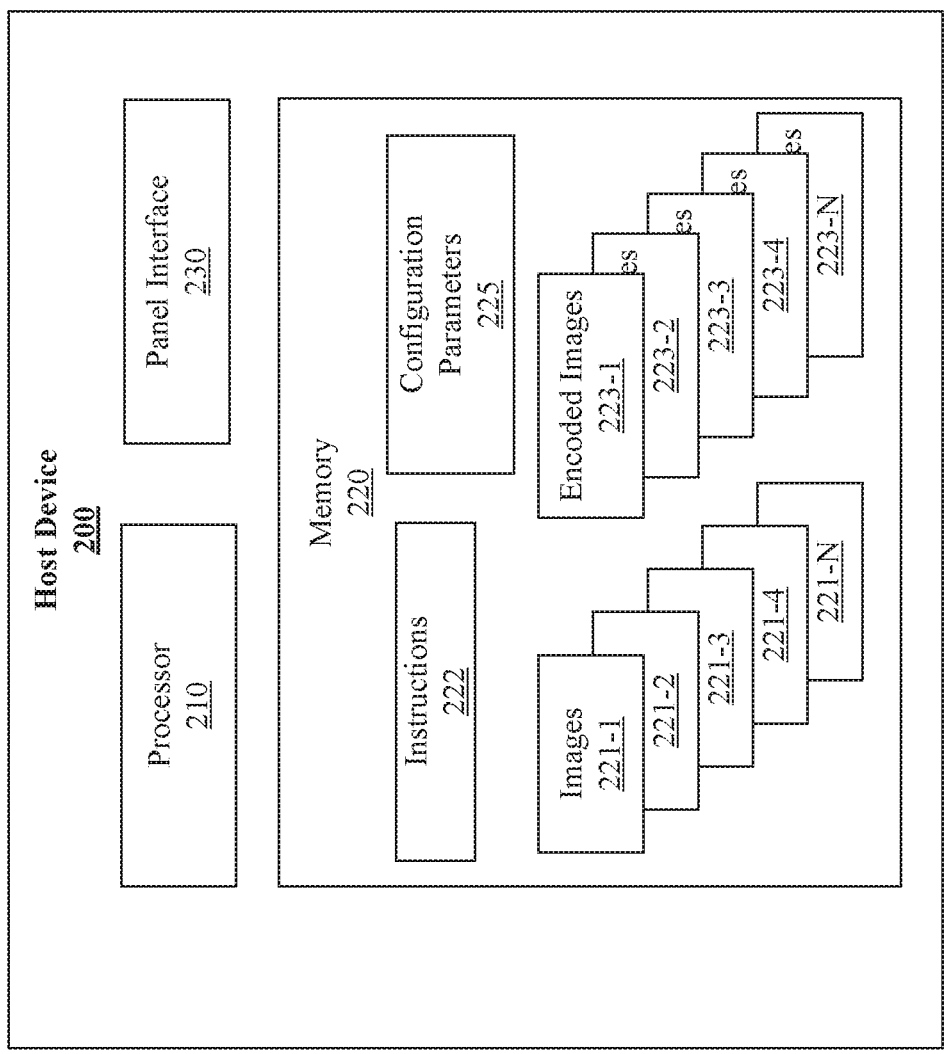
FIG. 2 illustrates an example host device of the display system of FIG. 1.
Figure 3:
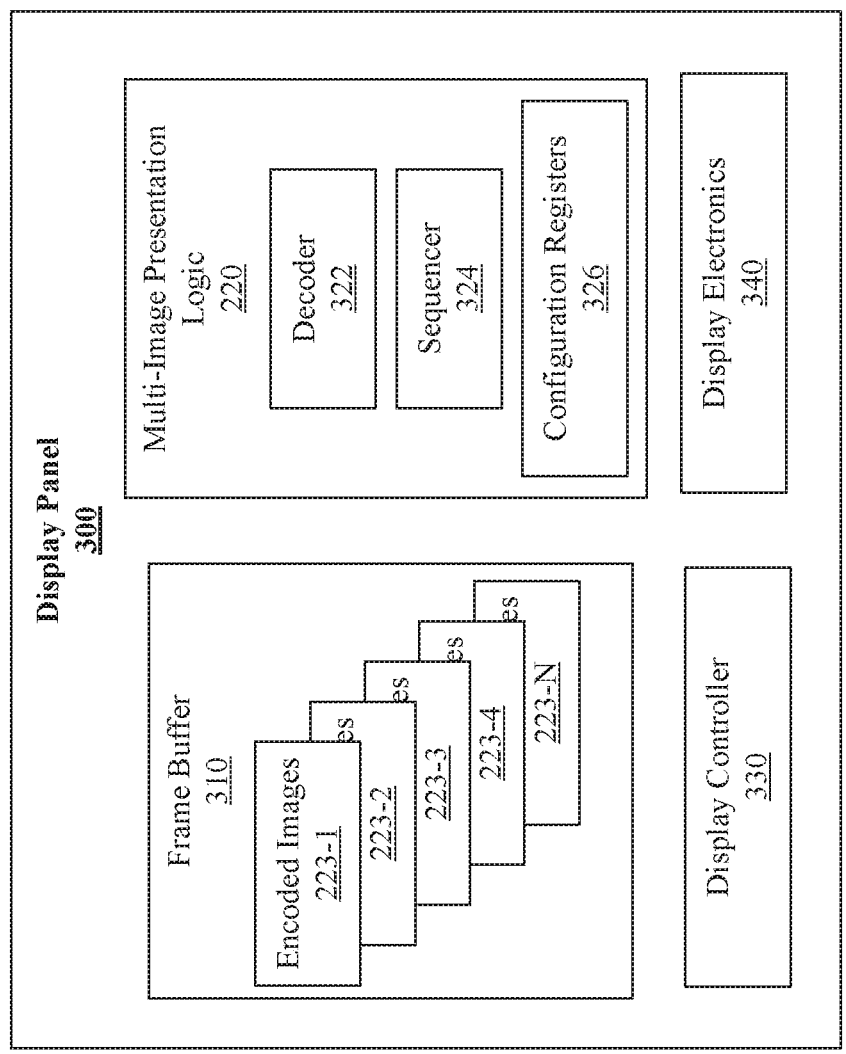
FIG. 3 illustrates an example display panel of the display system of FIG. 1.

FIGS. 1-3 illustrate a system 100 including a host device 200 and a display panel 300, arranged according to at least one embodiment of the disclosure. In general, FIG. 1 depicts the system 100 while FIGS. 2 and 3 depict the host device 200 and display panel 300, respectively, in greater detail. These figures are referenced together in discussing the system 100, the host device 200 and the display panel 300.

As depicted, the system 100 includes the host device 200 coupled to the display panel 300 via a display interconnect 101. Display interconnect 101 can be any of a variety of interconnects, such as, for example, a high definition media interface (HDMI) interconnect, a display port interconnect, or a mobile industry processor interface (MIPI) display serial interface (DSI) interconnect. In general, display interconnect 101 coupled host device 200 and display panel 300. More specifically, display interconnect 101 couples panel interface 230 and display controller 330 to electrically couple host device 200 to display panel 300 such that host device 200 can send commands and frames to display panel 300. This is described in greater detail below.

System 100 could be implemented as any of a variety of electronic devices, such as, for example, a laptop computer, a tablet computer, a smart phone, a media display device, a home automation device, or the like. In general, system 100 can be integrated, that is, host device 200 and display panel 300 can be integrated into one housing or case. In other examples, display panel 300 can be external to host device 200. With some examples, system 100 can be implemented to operate on battery power. As such, the multi-image low power display mode described herein can be implemented to extend the operating life of the device.

Host device 200 includes a processor 210, memory 220, and panel interface 230. Memory 220 may store instructions 222, images 221-$n$ and encoded images 223-$n$, where n is a positive integer. Host device 200 may be provided as a System-on-Chip (SoC) device, such as may be integrated into a display system device (e.g., mobile phone, tablet computer, laptop, portable media device, etc.).

Memory 220 may further store configuration parameters 225. As the present disclosure is directed towards displaying a series of images in a low power mode of a display, n will often be greater than 2. It is noted, images 221-1, 221-2, 221-3, 221-4 and 221-N and corresponding encoded images 223-1, 223-2, 223-3, 223-4 and 223-N, respectively, are depicted. This is done for purposes of clarity of presentation and not to be limiting.

In general, images 221-n can be any image (or frame) to be displayed on display panel 300. Said differently, images 221-n can comprise indications of colors for pixels in an image to be displayed. Encoded images 223-n correspond to images 221-n, encoded, compressed, or otherwise converted into an alternative format suitable for use by display panel 300 to present the images in a low power mode. In general, encoded images 223-n can be generated from images 221-n and any of a variety of encoding schemes. In some examples, encoded images 223-n can be generated based on an lossy encoding scheme, such as, for example, the joint photograph experts group (JPEG), exchangeable image file format (EXIF), tagged image file format (TIFF), graphics interchange format (GIF), portable pixmap (PPM), better portable graphics (BPG), or the like.

Display panel 300 includes frame buffers 310, multi-image presentation circuitry 320, display controller 330, and display electronics 340. Frame buffer 310 stores encoded images 223-n. In particular, FIG. 3 depicts frame buffer 310 storing encoded images 223-1, 223-2, 223-3, 223-4 and 223-N.

Panel interface 230 comprises circuitry arranged to send commands and data (e.g., encoded images 223-n, or the like) to display panel 300. Likewise, display controller 330 comprises circuitry arranged to receive commands and data (e.g., encoded images 223-n, or the like) from host device 200. Panel interface 230 and display controller 330 can be coupled via display interconnect 101, for example, as shown in FIG. 1.

During operation, processor 210, in executing instructions 222, can generate encoded images 223-n from images 221-n. For example, processor 210, in executing instructions 222, can encode images 221-n using an encoding scheme (e.g., JPEG, GIF, BPG, or the like) to generate encoded images 223-n. With some examples, processor 210, in executing instructions 222, can query display panel 300 to determine supported encoding schemes. For example, panel interface 230 can assert a command including an indication to reply with supported encoding types to display controller 330. Display controller 330, responsive to the command, can respond with an indication of the supported encoding types, that is, encoding types supported by decoder 322.

Processor 210, in executing instructions 222, can write encoded images 223-n to frame buffer 310. For example, processor 210, via display interconnect 101, can send encoded images 223-n to display panel 300 and cause the encoded images 223-n to be stored in frame buffer 310. In some examples, the number of encoded images 223-n can be selected (e.g., determined by processor 210 in executing instructions 222) based in part on the size (e.g., in bytes, or the like) of frame buffer 310 and the size of each the encoded images 223-n. As an example, the greater the compression of the encoded images 223-n, the more total encoded images 223-n can be stored in frame buffer 310. It is noted, that the present disclosure can often be implemented to display advertisements (images, videos, etc.). As such, the quality of the displayed images can be balanced with the number of advertisements desired to be displayed. That is, the encoding scheme used to generate encoded images 223-n can be lossy and can compress images 221-n.

Processor 210, in executing instructions 222, generates parameters 225 for the display panel to use in displaying the encoded images 223-n. Processor 210, in executing instructions 222 provides configuration parameters 225 to display panel, for example, via one or more commands asserted by panel interface 230. With some examples, configuration parameters 225 can include an indication of the format of encoded images 223-n (e.g., the encoding scheme, or the like), the number of encoded images (e.g., N, or the like), an address in frame buffer 310 corresponding to each encoded image 223-n, the size (e.g., in bytes, or the like) of each encoded image 223-n, a period (e.g., in seconds, in refresh cycles, or the like) over which to display each encoded image 223-n.

Processor 210, in executing instructions 222, can communicate (e.g., via commands send over display interconnect 101, or the like) configuration parameters 225 to display panel 300 and can place the display panel in the low power multi-image presentation mode. Additionally, processor 210, in executing instructions 222 can place host device in a low power state. For example, processor 210 can be placed in a lower power state, memory 220 can be placed in a lower power state, other components (not shown) of host device 200 can be placed in a low power state.

Display panel 300, however, can remain active. Multi-image presentation circuitry 320 can include decoder 322, sequencer 324, and configuration registers 326. Configuration registers 326 can store indications of configuration parameters 225 discussed above. Values of the configuration registers 326 can be set via commands asserted by host device 200, examples of which are given in greater detail below.

Decoder 322, based on configuration parameters 225 indicated by configuration registers 326, can decode encoded images 223-n while sequencer 324 can sequence the encoded images 223-n into the order specified by configuration parameters 225. Said differently, sequencer 324 can generate a bit stream of decoded images. Display controller 330 can send the decoded images (e.g., bit stream generated by sequencer 324, or the like) to display electronics 340 for presentation or display on display panel 300.

With some examples, the processor 210 may include circuitry or processor logic, such as, for example, any of a variety of commercial processors. In some examples, the processor 210 may include multiple processors, a multi-threaded processor, a multi-core processor (whether the multiple cores coexist on the same or separate dies), and/or a multi-processor architecture of some other variety by which multiple physically separate processors are in some way linked. Additionally, in some examples, the processor 210 may include graphics processing portions and may include dedicated memory, multiple-threaded processing and/or some other parallel processing capability.

Memory 220, frame buffer 310, and configuration registers 326 may include logic, a portion of which includes arrays of integrated circuits, forming non-volatile memory to persistently store data or a combination of non-volatile memory and volatile memory. It is to be appreciated, that the memory 220, frame buffer 310 and/or configuration registers 326 may be based on any of a variety of technologies. In particular, the arrays of integrated circuits included in memory 220, frame buffer 310, or configuration registers 326 may be arranged to form one or more types of memory, such as, for example, dynamic random access memory (DRAM), NAND memory, NOR memory, or the like.

Panel interface 230 and display controller 330 may include logic and/or features to support a communication interface. For example, the panel interface 230 and display controller 330 may include one or more interfaces that operate according to various communication protocols or standards to communicate over direct or network communication links.

Display electronics 340 can comprise a display panel backplane and associated components. Display electronics 340 may comprise a light emitting diode (LED) display backplane, an organic LED (OLED) display backplane, a liquid crystal displays (LCD) display backplane, or the like.

Figure 4:
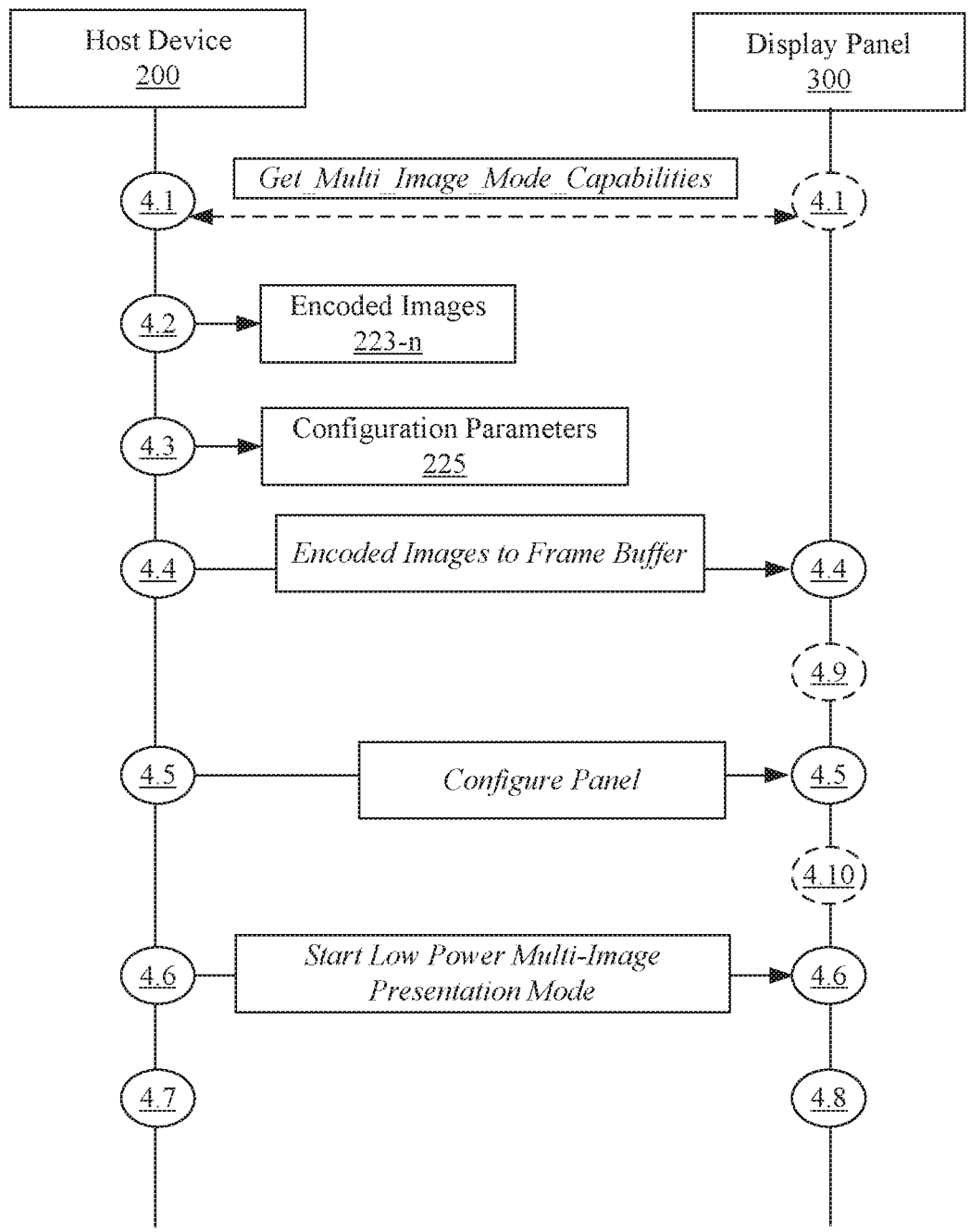
FIG. 4 illustrates a first example technique.

FIG. 4 illustrates a technique 400 to initiate a multi-image presentation low power mode for a display panel, according to embodiments of the present disclosure. Technique 400 is described with reference to the system 100 depicted in FIGS. 1 to 3. However, technique 400 could be implemented by a system having a different configuration than depicted. Examples are not limited in this context. Technique 400 can begin at circle 4.1. At circle 4.1, host device 200 can determine supported capabilities of display panel 300. In some embodiments, supported capabilities of display panel 300 can be preconfigured at host device 200. For example, where host device and display panel are provided as a single unit (e.g., smart phone, home media device, etc.) then display panel capabilities can be preconfigured. In other embodiments, host device 200 can query (e.g., via a command, or the like) display panel 300 to determine display panel capabilities. As a specific example, get_multi_image-_mode_capabilities command could be included in a command set, such as, the MIPI DSI command set. Host device 200, at circle 4.1, could assert this command against display panel. Response to the command, display panel could reply with supported capabilities (e.g., frame buffer 310 size, supported encoding formats, etc.) also at circle 4.1.

Continuing to circle 4.2, host device 200 can generate encoded images 223-n. Processor 210, in executing instructions 222, can generate encoded images 223-n using an encoding scheme supported by display panel 300. Continuing to circle 4.3, host device 200 can generate configuration parameters 225. Processor 210, in executing instructions 222 can generate configuration parameters 225.

Continuing to circle 4.4, host device 200 can store encoded images in frame buffer 310. Processor 210, in executing instructions 222, can cause a command to be asserted on display panel 300 to cause encoded images to be stored to frame buffer 310. For example, the MIPI DSI commands write_memory_start and write_memory_continue can be asserted to cause encoded images to be written to frame buffer 310. Said differently, processor 210 can assert these commands against display panel 300 to cause data corresponding to encoded images 223-n to be transferred from memory 220 to frame buffer 310.

Continuing to circle 4.5, host device 300 can configure display panel for the low power multi-image presentation mode. Processor 210, in executing instructions 222, can set values in configuration registers 326 indicating configuration parameters 225. As a specific example, set_multi_image_mode_capabilities command could be included in a command set, such as, the MIPI DSI command set. Assertion of this command could program configuration registers 326, or otherwise communicate data indicating configuration parameters 225 to display panel 300.

Continuing to circle 4.6, host device 300 can start the low power multi-image presentation mode at display panel 300. Processor 210, in executing instructions 222, can assert a command at display panel 300 indicating the low power multi-image presentation mode is to begin. As a specific example, enter_multi_image_mode command could be included in a command set, such as, the MIPI DSI command set.

Continuing to circle 4.7, host device 200 can enter a low power mode. For example, component of host device 200 (e.g., processor 210, or the like) can be placed in a lower power state, sleep state, or the like. Continuing to circle 4.8, display panel 300 can conduct the low power multi-image presentation mode. For example, display panel can decode and display encoded images 223-n in a sequence and timing indicated by configuration parameters 225.

In some examples, technique 400 could include optional circles 4.9 and 4.10. For example, at circle 4.9, the host device 200 can turn the panel 300 off prior to configuring the panel configuration registers 326 (e.g., at circles 4.5) or the like. At circle 4.10, the host device 200 can turn the panel 300 back on after configuration. As such, the technique 400 can be implemented to mitigate image tearing or other visual effects resulting from changing the parameters and initiating the multi-image presentation mode.

Figure 5:
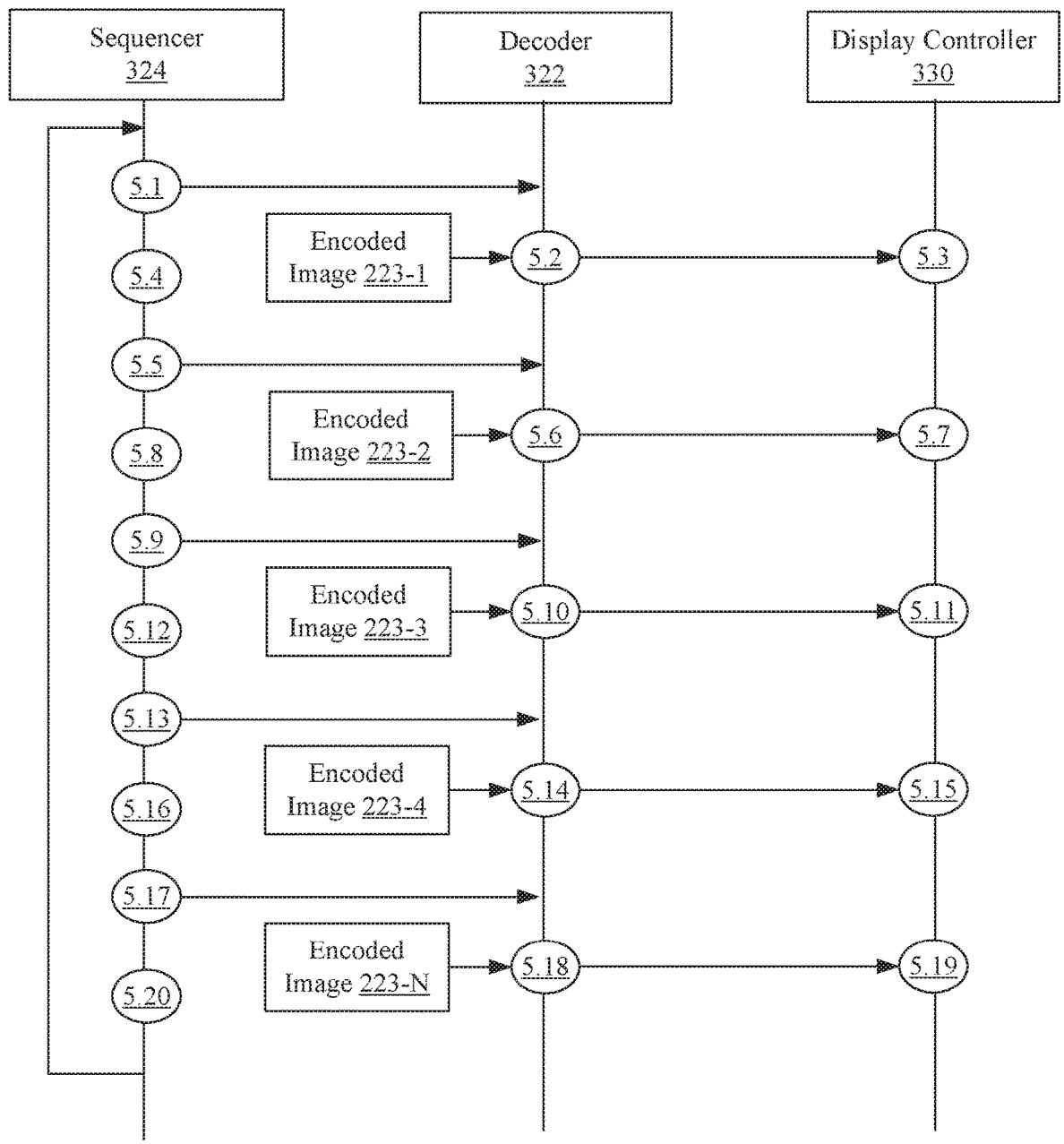
FIG. 5 illustrates a second example technique.

FIG. 5 illustrates a technique 500 for a low power multi-image presentation, according to embodiments of the present disclosure. Technique 500 is described with reference to the system 100 depicted in FIGS. 1 to 3. However, technique 500 could be implemented by a system having a different configuration than depicted. With some examples, technique 500 could be implemented at circle 4.8 of technique 400. Examples are not limited in this context.

Technique 500 can begin at circle 5.1. At circle 5.1, sequencer 324 can determine one of encoded images 223-n to decode and signal decoder 322 which image 223-n to decode. For example, sequencer 324 can determine an order of presentation for encoded images 223-n as well as locations of encoded images 223-n in frame buffer 310 from configuration registers 326. Continuing to circle 5.2, decoder can fetch the selected encoded image 223-n from frame buffer 310 and decode the encoded image 223-n. For example, assume that encoded images are to be displayed in the following order [encoded image 223-1, encoded image 223-2, encoded image 223-3, encoded image 223-4, encoded image 223-N], sequencer 324 can signal decoder 322 to decode image 223-1 at circle 5.1. At circle 5.2, decoder 322 can decode encoded image 223-1 and send the decoder image to display controller 330 for presentation or display via display electronics 340.

Continuing to circle 5.3, display controller 330 can receive the decoded bitstream corresponding to encoded image 223-1 from decoder 324. At circle 5.3, display controller can cause display panel 300 (e.g., display electronics 340, or the like) to display image based on the received bitstream. In general, the displayed image will correspond to image 221-1. However, due to the encoding, which may be lossy, the image might differ slightly. Continuing to circle 5.4, sequencer 322 can wait a period of time, for example corresponding to the time to display each of encoded images indicated in configuration register 326, or the like.

From circles 5.1 to 5.4, technique 500 can continue to circles 5.5 to 5.8 to select the next image in the sequence (e.g., encoded image 223-2 in this case), decode the image, send the decoded bitstream to the display controller and display the image for the display time. More particularly, technique 500 can include circle 5.5. At circle 5.5 sequencer 322 can determine one of encoded images 223-n to decode and signal decoder 322 which image 223-n to decode. Continuing with the current example, sequencer can signal decoder to decode encoded image 223-2. Continuing to circle 5.6, decoder can fetch encoded image 223-2 from frame buffer 310, decode the encoded image 223-2, and send the bitstream for the decoded image to display controller 330. Continuing to circle 5.7, display controller 330 can receive the decoded bitstream corresponding to encoded image 223-2 from decoder 324 and can cause display panel 300 (e.g., display electronics 340, or the like) to display image based on the received bitstream. Continuing to circle 5.8, sequencer 322 can wait a period of time, for example corresponding to the time to display each of encoded images indicated in configuration register 326, or the like.

From circles 5.5 to 5.8, technique 500 can continue to circles 5.9 to 5.12 to select the next image in the sequence (e.g., encoded image 223-3 in this case), decode the image, send the decoded bitstream to the display controller and display the image for the display time. More particularly, technique 500 can include circle 5.9. At circle 5.9 sequencer 322 can determine one of encoded images 223-n to decode and signal decoder 322 which image 223-n to decode. Continuing with the current example, sequencer can signal decoder to decode encoded image 223-3. Continuing to circle 5.10, decoder can fetch encoded image 223-3 from frame buffer 310, decode the encoded image 223-3, and send the bitstream for the decoded image to display controller 330. Continuing to circle 5.11, display controller 330 can receive the decoded bitstream corresponding to encoded image 223-3 from decoder 324 and can cause display panel 300 (e.g., display electronics 340, or the like) to display image based on the received bitstream. Continuing to circle 5.12, sequencer 322 can wait a period of time, for example corresponding to the time to display each of encoded images indicated in configuration register 326, or the like.

From circles 5.9 to 5.12, technique 500 can continue to circles 5.13 to 5.16 to select the next image in the sequence (e.g., encoded image 223-4 in this case), decode the image, send the decoded bitstream to the display controller and display the image for the display time. More particularly, technique 500 can include circle 5.13. At circle 5.13 sequencer 322 can determine one of encoded images 223-n to decode and signal decoder 322 which image 223-n to decode. Continuing with the current example, sequencer can signal decoder to decode encoded image 223-4. Continuing to circle 5.14, decoder can fetch encoded image 223-4 from frame buffer 310, decode the encoded image 223-4, and send the bitstream for the decoded image to display controller 330. Continuing to circle 5.15, display controller 330 can receive the decoded bitstream corresponding to encoded image 223-4 from decoder 324 and can cause display panel 300 (e.g., display electronics 340, or the like) to display image based on the received bitstream. Continuing to circle 5.16, sequencer 322 can wait a period of time, for example corresponding to the time to display each of encoded images indicated in configuration register 326, or the like.

From circles 5.13 to 5.16, technique 500 can continue to circles 5.17 to 5.20 to select the next image in the sequence (e.g., encoded image 223-N in this case), decode the image, send the decoded bitstream to the display controller and display the image for the display time. More particularly, technique 500 can include circle 5.17. At circle 5.17 sequencer 322 can determine one of encoded images 223-n to decode and signal decoder 322 which image 223-n to decode. Continuing with the current example, sequencer can signal decoder to decode encoded image 223-N. Continuing to circle 5.18, decoder can fetch encoded image 223-N from frame buffer 310, decode the encoded image 223-N, and send the bitstream for the decoded image to display controller 330. Continuing to circle 5.19, display controller 330 can receive the decoded bitstream corresponding to encoded image 223-N from decoder 324 and can cause display panel 300 (e.g., display electronics 340, or the like) to display image based on the received bitstream. Continuing to circle 5.20, sequencer 322 can wait a period of time, for example corresponding to the time to display each of encoded images indicated in configuration register 326, or the like.

Figure 6:
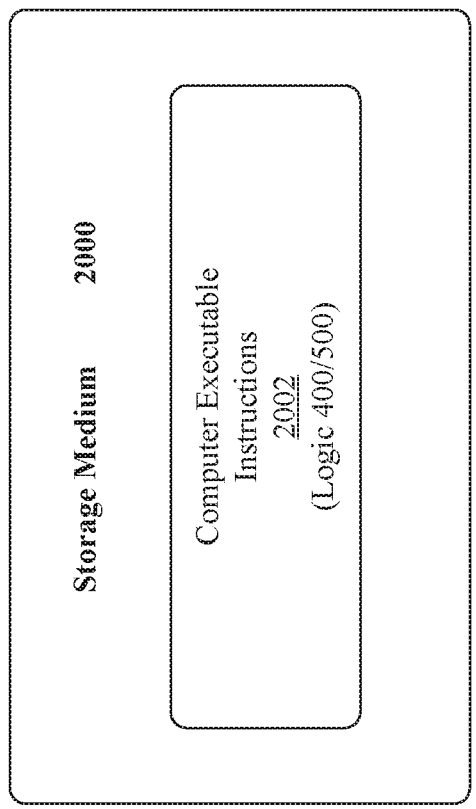
FIG. 6 illustrates one embodiment of a storage medium.

Technique 500 can be continually repeated, for example, until host device 200 asserts a command (e.g., stop_multi_image_mode, or the like) against display panel 300. As such, from circle 5.20, technique 500 can return to circle 5.1, FIG. 6 illustrates an embodiment of a storage medium 2000. The storage medium 2000 may comprise an article of manufacture. In some examples, the storage medium 2000 may include any non-transitory computer readable medium or machine readable medium, such as an optical, magnetic or semiconductor storage. The storage medium 2000 may store various types of computer executable instructions e.g., 2002). For example, the storage medium 2000 may store various types of computer executable instructions to implement technique 400. In some examples, the storage medium 2000 may store various types of computer executable instructions to implement technique 500.

Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 7:
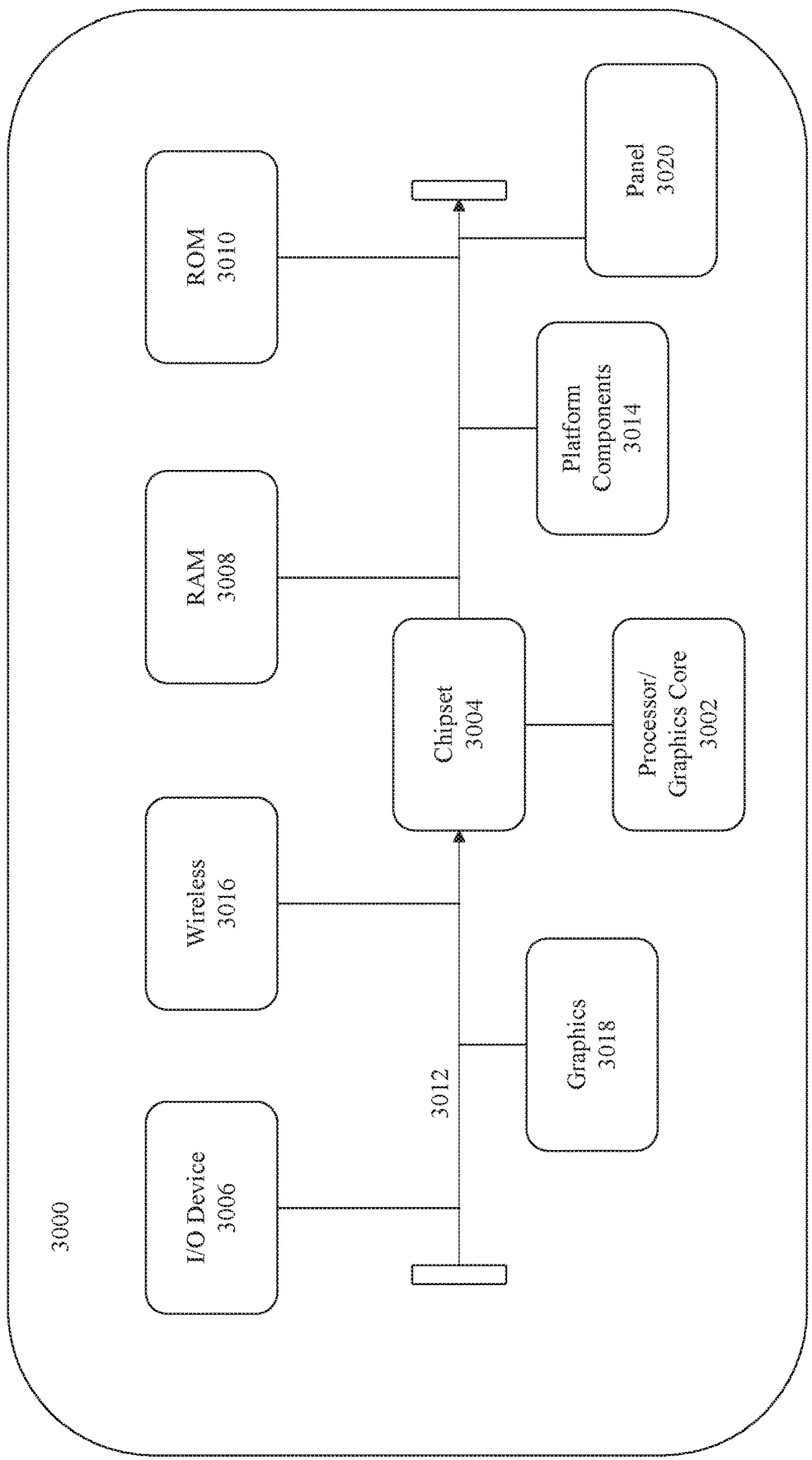
FIG. 7 illustrates one embodiment of a device.

FIG. 7 is a diagram of an exemplary system embodiment and in particular, depicts a platform 3000, which may include various elements. For instance, this figure depicts that platform (system) 3000 may include a processor/graphics core 3002, a chipset 3004, an input/output (I/O) device 3006, a random access memory (RAM) (such as dynamic RAM (DRAM)) 3008, and a read only memory (ROM) 3010, panel 3020 (e.g., panel 18, or the like) and various other platform components 3014 (e.g., a fan, a cross flow blower, a heat sink, DTM system, cooling system, housing, vents, and so forth). System 3000 may also include wireless communications chip 3016 and graphics device 3018. The embodiments, however, are not limited to these elements.

As depicted, I/O device 3006, RAM 3008, and ROM 3010 are coupled to processor 3002 by way of chipset 3004. Chipset 3004 may be coupled to processor 3002 by a bus 3012. Accordingly, bus 3012 may include multiple lines.

Processor 3002 may be a central processing unit comprising one or more processor cores and may include any number of processors having any number of processor cores. The processor 3002 may include any type of processing unit, such as, for example, CPU, multi-processing unit, a reduced instruction set computer (RISC), a processor that has a pipeline, a complex instruction set computer (CISC), digital signal processor (DSP), and so forth. In some embodiments, processor 3002 may be multiple separate processors located on separate integrated circuit chips. In some embodiments processor 3002 may be a processor having integrated graphics, while in other embodiments processor 3002 may be a graphics core or cores.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other. Furthermore, aspects or elements from different embodiments may be combined.

The following examples pertain to further embodiments, from which numerous permutations and configurations will be apparent.

Example 1

A system, comprising: a display panel comprising a frame buffer; and a host device coupled to the display panel, the host device comprising a processor and host memory, the host memory comprising a plurality of images and instructions, the instructions when executed by the processor cause the processor to: encode the plurality of images; store the encoded plurality of images in the frame buffer configure the display panel to display the plurality of images in a sequence while the host device is in a low power state; and place at least the processor in a low power state.

Example 2

The system of example 1, the display panel comprising decoder circuitry, the decoder circuitry to decode the encoded plurality of images to generate an image bit stream, the display panel to display the plurality of images based in the image bit stream.

Example 3

The system of example 2, the display panel comprising a display controller and a display backplane coupled to the display controller, the display controller to receive the image bit stream and cause the display backplane to illuminate one or more pixels based on the image bit stream.

Example 4

The system of example 2, the instructions when executed by the processor cause the processor to send at least one command to the display panel to indicate at least one or a display order of the plurality of images, a period to display each of the plurality of images, a location of each of the encoded plurality of images in the frame buffer, or an encoding scheme corresponding to the encoded plurality of images.

Example 5

The system of example 4, wherein the command is in accordance with the mobile industry processor interface (MIPI) display serial interface (DSI) standard, the high definition multimedia interface standard, or the DisplayPort standard.

Example 6

The system of example 4, the display panel comprising sequencer circuitry, the sequencer circuitry to: determine an order to display the plurality of images based in part on the display order; and send a first control signal to the decoder including an indication to decode a first one of the encoded plurality of images based on the determined order; and send, after the period, a second control signal to the decoder including an indication to decode a second one of the encoded plurality of images based on the determined order.

Example 7

The system of example 1, comprising a display interconnect, the display panel and the host device coupled via the display interconnect.

Example 8

The system of example 7, the display interconnect comprising a mobile industry processor interface (MIPI) display serial interface (DSI) interconnect.

Example 9

At least one machine-readable storage medium comprising instructions that when executed by a processor at a host device coupled to a display panel via a display interconnect, cause the processor to: encode a plurality of images based in part on an encoding scheme; store the encoded plurality of images in a frame buffer of the display panel; configure the display panel to display the encoded plurality of images in a specified sequence while the host device is in a low power state; and place at least the processor of the host device in a low power state.

Example 10

The at least one machine-readable storage medium of example 9, comprising instructions that further cause the processor to send at least one command to the display panel to indicate at least one of the specified sequence, a period to display each of the encoded plurality of images, a location of each of the encoded plurality of images in the frame buffer, or the encoding scheme.

Example 11

The at least one machine-readable storage medium of example 10, wherein the command is in accordance with the mobile industry processor interface (MIPI) display serial interface (DSI) standard.

Example 12

A display panel apparatus, comprising: a frame buffer, the frame buffer arranged to receive a plurality of encoded images from a host device processor; sequencer circuitry arranged to: determine an order to display the plurality of encoded images based in part on configuration information received from the host device processor; and determine a period to display each of the plurality of encoded images based in part on the configuration information; and decoder circuitry arranged to: decode a first one of the plurality of encoded images to generate a first image bit stream, the first one of the plurality of encoded images based on the determined order; and send the first image bitstream to a display controller including an indication to display the decoded first one of the plurality of encoded images based on the first bit stream.

Example 13

The display panel apparatus of example 12, the decoder circuitry further arranged to: decode a second one of the plurality of encoded images to generate a second image bit stream, the second one of the plurality of encoded images based on the determined order; and send, after a time corresponding the period, the second image bitstream to the display controller including an indication to display the decoded second one of the plurality of encoded images based on the second bit stream.

Example 14

The display panel apparatus of example 12, comprising the display controller.

Example 15

The display panel apparatus of example 12, the sequencer arranged to receive commands from the host device processor, at least one of the commands including an indication of the order.

Example 16

The display panel apparatus of example 15, at least one other of the command including an indication of the period.

Example 17

The display panel apparatus of example 15, at least one other of the commands including an indication of an encoding scheme with which the plurality of images are encoded, the decoder to decode the first one of the plurality of encoded images based in part on the encoding scheme.

Example 18

The display panel apparatus of example 15, wherein the commands comprise mobile industry processor interface (MIPI) display serial interface (DSI) commands.

Example 19

The display panel apparatus of example 15, comprising at least one configuration register, the at least one configuration register to be set responsive, at least in part, to assertion of one of the commands by the host device processor.

Example 20

The display panel apparatus of example 15, the decoder to decode the first one of the plurality of encoded images based responsive, at least in part, to assertion of one of the commands by the host device processor.

Example 21

A method implemented by a host device, comprising: encoding a plurality of images; storing the encoded plurality of images in a frame buffer of a display panel coupled to the host device; configuring the display panel to display the plurality of images in a sequence while the host device is in a low power state; and placing the host device in a low power state.

Example 22

The method of example 21, comprising sending at least one command to the display panel to indicate at least one or a display order of the plurality of images, a period to display each of the plurality of images, a location of each of the encoded plurality of images in the frame buffer, or an encoding scheme corresponding to the encoded plurality of images.

Example 23

The method of example 22, wherein the command is in accordance with the mobile industry processor interface (MIPI) display serial interface (DSI) standard, the high definition multimedia interface standard, or the DisplayPort standard.

Example 24

The method of example 21, the host device coupled to the display panel via a display interconnect.

Example 25

The method of example 24, the display interconnect comprising a mobile industry processor interface (MIPI) display serial interface (DSI) interconnect, a HDMI interconnect, or a DP interconnect.

Example 26

A method implemented by a display panel, comprising: receiving, in a frame buffer, an encoded plurality of images; decoding the encoded plurality of images; and presenting the plurality of images in a sequence while the host device is in a low power state.

Example 27

The method of example 26, comprising decoding the encoded plurality of images to generate an image bit stream, the display panel to display the plurality of images based in the image bit stream.

Example 28

The method of example 27, comprising receiving, at a display controller, the image bit stream; and causing a display backplane to illuminate one or more pixels based on the image bit stream.

Example 29

The method of example 26, comprising receiving at least one command indicating at least one of a display order of the plurality of images, a period to display each of the plurality of images, a location of each of the encoded plurality of images in the frame buffer, or an encoding scheme corresponding to the encoded plurality of images.

Example 30

The method of example 29, wherein the command is in accordance with the mobile industry processor interface (MIPI) display serial interface (DSI) standard, the high definition multimedia interface standard, or the DisplayPort standard.

Example 31

The method of example 29, comprising determining an order to display the plurality of images based in part on the display order; decoding a first one of the encoded plurality of images based on the determined order; and decoding, after the period, a second one of the encoded plurality of images based on the determined order.

Example 32

The method of example 26, the display panel coupled to the host device coupled via a display interconnect.

Example 33

The method of example 32, the display interconnect comprising a mobile industry processor interface (MIPI) display serial interface (DSI) interconnect.

Example 34

An apparatus, comprising means arranged to implement the function of any one of examples 21 to 33.

Example 35

At least one non-transitory computer-readable storage medium comprising instructions that when executed by a computing device, cause the computing device to perform the method of any one of examples 21 to 33.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the Plain-English equivalents of the respective terms "comprising" and "wherein," respectively. Moreover, the terms "first," "second," "third," and so forth, are used merely as labels, and are not intended to impose numerical requirements on their objects.

The invention claimed is:

1. A system, comprising:
a display panel comprising a frame buffer and decoder circuitry arranged to decode an encoded plurality of images to generate an image bit stream comprising a plurality of images, the display panel to display the plurality of images based on the image bit stream; and
a host device coupled to the display panel, the host device comprising a processor and host memory, the host memory comprising the plurality of images and instructions, the instructions when executed by the processor cause the processor to:
encode the plurality of images;
store the encoded plurality of images in the frame buffer;
configure the display panel to display the plurality of images in a sequence while the host device is in a low power state;
send at least one command to the display panel to indicate at least one of a display order of the plurality of images, a period to display each of the plurality of images, a location of each of the encoded plurality of images in the frame buffer, or an encoding scheme corresponding to the encoded plurality of images; and
place at least the processor in a low power state.

2. The system of claim 1, the display panel comprising a display controller and a display backplane coupled to the display controller, the display controller to receive the image bit stream and cause the display backplane to illuminate one or more pixels based on the image bit stream.

3. The system of claim 1, wherein the command is in accordance with one of a mobile industry processor interface (MIPI) display serial interface (DSI) standards, one of a high definition multimedia interface standards, or one of a DisplayPort standards.

4. The system of claim 1, the display panel comprising sequencer circuitry, the sequencer circuitry to:
determine an order to display the plurality of images based in part on the display order;
send a first control signal to the decoder including an indication to decode a first one of the encoded plurality of images based on the determined order; and
send, after the period, a second control signal to the decoder including an indication to decode a second one of the encoded plurality of images based on the determined order.

5. The system of claim 1, comprising a display interconnect, the display panel and the host device coupled via the display interconnect.

6. The system of claim 5, the display interconnect comprising a mobile industry processor interface (MIPI) display serial interface (DSI) interconnect.

7. At least one non-transitory machine-readable storage medium comprising instructions that when executed by a processor at a host device coupled to a display panel via a display interconnect, cause the processor to:
encode a plurality of images based in part on an encoding scheme;
store the encoded plurality of images in a frame buffer of the display panel;
configure the display panel to display the encoded plurality of images in a specified sequence while the host device is in a low power state;
send at least one command to the display panel to indicate at least one of a display order of the plurality of images, a period to display each of the plurality of images, a location of each of the encoded plurality of images in the frame buffer, or an encoding scheme corresponding to the encoded plurality of images; and
place at least the processor of the host device in a low power state,
wherein decoder circuitry at the display panel is arranged to decode the encoded plurality of images to generate an image bit stream comprising the plurality of images, the display panel to display the plurality of images based on the image bit stream.

8. The at least one non-transitory machine-readable storage medium of claim 7, comprising instructions that further cause the processor to send at least one command to the display panel to indicate at least one of the specified sequence, a period to display each of the encoded plurality of images, a location of each of the encoded plurality of images in the frame buffer, or the encoding scheme.

9. The at least one non-transitory machine-readable storage medium of claim 8, wherein the command is in accordance with one of a mobile industry processor interface (MIPI) display serial interface (DSI) standards.

10. A display panel apparatus, comprising:
a frame buffer, the frame buffer arranged to receive a plurality of encoded images from a host device processor;
sequencer circuitry arranged to:
 determine an order to display the plurality of encoded images based in part on configuration information received from the host device processor; and
 determine a period to display each of the plurality of encoded images based in part on the configuration information; and
decoder circuitry arranged to:
 decode a first one of the plurality of encoded images to generate a first image bitstream, the first one of the plurality of encoded images based on the determined order; and
 send the first image bitstream to a display controller including an indication to display the decoded first one of the plurality of encoded images based on the first image bit-stream.

11. The display panel apparatus of claim 10, the decoder circuitry further arranged to:
 decode a second one of the plurality of encoded images to generate a second image bitstream, the second one of the plurality of encoded images based on the determined order; and
 send, after a time corresponding the period, the second image bitstream to the display controller including an indication to display the decoded second one of the plurality of encoded images based on the second image bit-stream.

12. The display panel apparatus of claim 10, comprising the display controller.

13. The display panel apparatus of claim 10, the sequencer arranged to receive commands from the host device processor, at least one of the commands including an indication of the order.

14. The display panel apparatus of claim 13, at least one other of the commands including an indication of the period.

15. The display panel apparatus of claim 13, at least one other of the commands including an indication of an encoding scheme with which the plurality of images are encoded, the decoder to decode the first one of the plurality of encoded images based in part on the encoding scheme.

16. The display panel apparatus of claim 13, wherein the commands comprise mobile industry processor interface (MIPI) display serial interface (DSI) commands.

17. The display panel apparatus of claim 13, comprising at least one configuration register, the at least one configuration register to be set responsive, at least in part, to assertion of one of the commands by the host device processor.

18. The display panel apparatus of claim 13, the decoder to decode the first one of the plurality of encoded images based responsive, at least in part, to assertion of one of the commands by the host device processor.

* * * * *

UNITED STATES PATENT AND TRADEMARK OFFICE
CERTIFICATE OF CORRECTION

PATENT NO. : 10,955,903 B2
APPLICATION NO. : 16/229447
DATED : March 23, 2021
INVENTOR(S) : Sudeep Divakaran and VNS Murthy Sristi It is certified that error appears in the above-identified patent and that said Letters Patent is hereby corrected as shown below:

In the Claims

Column 15, Line 33, Claim 10 replace "bit-stream" with -- bitstream --.

Column 16, Line 9, Claim 11 replace "bit-stream" with -- bitstream --.

Signed and Sealed this
Twenty-fourth Day of August, 2021

Drew Hirshfeld
*Performing the Functions and Duties of the
Under Secretary of Commerce for Intellectual Property and
Director of the United States Patent and Trademark Office*